United States Patent
Sun et al.

(10) Patent No.: US 7,406,559 B2
(45) Date of Patent: **\*Jul. 29, 2008**

(54) IN-CIRCUIT PROGRAMMING ARCHITECTURE WITH PROCESSOR, DELEGABLE FLASH CONTROLLER, AND CODE GENERATOR

(75) Inventors: Albert C. Sun, Hsinchu (TW); Jeon-Yung Ray, Hsinchu (TW); William Chen, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 326 days.

This patent is subject to a terminal disclaimer.

(21) Appl. No.: 10/924,400

(22) Filed: Aug. 23, 2004

(65) Prior Publication Data

US 2006/0041712 A1 Feb. 23, 2006

(51) Int. Cl.
*G06F 13/12* (2006.01)
*G06F 15/163* (2006.01)

(52) U.S. Cl. .................. 711/103; 711/147; 711/154; 712/34; 713/375

(58) Field of Classification Search .............. 711/103, 711/147, 154; 712/34, 37; 713/375
See application file for complete search history.

(56) References Cited

U.S. PATENT DOCUMENTS

| | | | | |
|---|---|---|---|---|
| 5,276,839 A | * | 1/1994 | Robb et al. ............ | 711/103 |
| 5,901,330 A | | 5/1999 | Sun et al. ............. | 395/828 |
| 6,141,700 A | * | 10/2000 | Iwata ................. | 710/3 |
| 6,151,657 A | | 11/2000 | Sun et al. ............. | 711/103 |
| 6,301,656 B1 | * | 10/2001 | Streett et al. .......... | 713/2 |
| 6,751,155 B2 | * | 6/2004 | Gorobets ............ | 365/230.09 |
| 6,766,408 B2 | * | 7/2004 | Nasu ................. | 711/103 |
| 6,868,458 B2 | * | 3/2005 | Kim .................. | 710/28 |
| 2005/0120146 A1 | * | 6/2005 | Chen et al. ........... | 710/22 |
| 2005/0289290 A1 | * | 12/2005 | Chen et al. ........... | 711/103 |

\* cited by examiner

*Primary Examiner*—Hyung Sough
*Assistant Examiner*—Anton Rabovianski
(74) *Attorney, Agent, or Firm*—Stout, Uxa, Buyan & Mullins, LLP (57) ABSTRACT

An architecture for an integrated circuit with in-circuit programming allows real-time modification of the in-circuit programming code and other code stored on the chip. The architecture utilizes a microprocessor and control logic on an integrated circuit having a single non-volatile memory that stores instructions and data, such as in-circuit programming and user code, and input/output ports and related structure for exchanging data with an external device. Using in-circuit programming code stored on the chip, the chip interactively establishes an in-circuit programming exchange with an external device to update data and instructions including the in-circuit programming code. Input/output conflicts during in-circuit programming can be avoided by employing a code generator that supplies control routines to the microprocessor during at least part of the in-circuit programming operations. The code generator allows the in-circuit programming code to be updated in real time.

29 Claims, 8 Drawing Sheets

IN-CIRCUIT PROGRAMMING ARCHITECTURE WITH PROCESSOR, DELEGABLE FLASH CONTROLLER, AND CODE GENERATOR

BACKGROUND OF THE INVENTION

1. Field of the Invention

The present invention relates to programming of integrated circuits and, more particularly, to architectures and methods for in-circuit programming (ICP) with processors and flash memory semiconductor devices.

2. Description of Related Art

In-circuit programming (ICP) integrated-circuit structures of the prior art have generally relied upon combinations of mask read only memory (ROM) modules and/or flash memory modules under the direct control of a microprocessor. An ICP structure using both a mask read only memory module and a flash memory module, as disclosed in U.S. Pat. No. 5,901,330 the entire contents of which are incorporated herein by reference, requires a die size large enough of course to contain both the mask read only memory module and the flash memory module. Moreover, as a result of such a programming structure utilizing the mask read only memory to store information such as portions of ICP code, this programming structure can be relatively inflexible for facilitating updating the ICP code.

Other ICP structures, such as disclosed in U.S. Pat. No. 6,151,657 the entire contents of which are incorporated herein by reference, harness a pair of flash memory modules or banks, thus requiring a relatively large die size once again to accommodate the multiple flash memory modules. In the configuration of this patent, both of the flash memory modules are apparently needed for implementing the ICP code update.

Both of the aforementioned architecture types thus employ multiple components and may very well implement programming during manufacturing of the devices which cannot be readily or efficiently updated. Another deficiency in these two types of ICP architectures can be a relatively heavy reliance on a microprocessor for ICP code updating that can for example tax the resources of the microprocessor. A need thus exists in the prior-art for an ICP architecture which can reduce costs by conserving for example die space, and which can improve reliability, efficiency and flexibility.

SUMMARY OF THE INVENTION

The present invention addresses these needs by providing an ICP integrated-circuit architecture which utilizes a single non-volatile memory device, such as a flash memory device; a microprocessor; and a simple logic memory controller coupled between the single non-volatile memory device and the microprocessor. Both ICP code and user code are contained in this single non-volatile memory device, and both can be updated by the ICP architecture without another specific memory hardware device.

Eliminating other memories may improve reliability and decrease power consumption. Cost and wafer die size may also be reduced. By reducing or eliminating the amount of mask read only memory (ROM) required by an integrated circuit design, for example, the present invention may permit a device to be manufactured before the ICP code is defined, decreasing time to market since the final code does not have to be programmed at the time of manufacture. Since, in accordance with an aspect of the present invention, all data is stored in reprogrammable non-volatile memory, updates may occur either on the fly in the field after deployment or in the factory at the time of initial production. This ability to provide real-time code updates in the field may reduce device obsolescence by eliminating an impact of hardware changes.

In accordance with another aspect of the invention, benefits can be obtained by reducing a number of high voltage pumping circuits, sense amplifiers, and input/output (I/O) ports through utilization of a single flash memory device for all ICP code and user code. The present invention also may avoid I/O conflicts during ICP code erase/program functions by employing a memory controller as a controlling means to handle at least a portion of this operation.

In accordance with yet another aspect of the invention, a port through which the integrated circuit communicates with external devices may be selected from a plurality of ports on the integrated circuit.

The present invention can comprise a single integrated circuit that may serve any function for which a microprocessor is suitable. For example, it may be a device controller for a numerically controlled (NC) machine; an interface device that accepts data from an external device, processes it and passes it on to another device; or a protocol device that takes data in one format and passes it on in another format. An illustrative, non-exhaustive, list of specific examples of typical applications and devices includes: liquid crystal display (LCD) monitors, Bluetooth™ devices; global positioning systems (GPS); cellular phones; personal digital assistants (PDAs); digital cameras; digital music players; messaging; web access; digital video disk (DVD) players; hard disk drives; graphics cards; printers; wireless local area networks (LANs); and set top boxes.

An embodiment of the present invention comprises a single non-volatile memory device that contains in-circuit programming code for programming the single non-volatile memory device and user code for facilitating communication with an external device. The embodiment further comprises a microprocessor configured to input instruction addresses to the single non-volatile memory device and to receive instructions from the single non-volatile memory device and a delegable memory controller. The delegable memory controller, which is operatively coupled between the microprocessor and the single non-volatile memory device, is configured to receive an in-circuit program update command and to perform an in-circuit programming update function on the single non-volatile memory device. The microprocessor is relieved of performing the in-circuit programming update function by executing at least one control routine supplied by a code generator. The code generator is operatively connected between the delegable memory controller and the microprocessor and is capable of providing instructions to be executed by the microprocessor. The microprocessor does not access the single non-volatile memory device while executing the at least one control routine.

According to an aspect of the invention, a method of in-circuit programming comprises the steps of storing, receiving, forwarding, buffering, and accessing sets of instructions. A set of user code or ICP instructions is stored in the single flash memory device. The ICP set of instructions includes erase/program command handler code to operate the delegable flash memory controller and communicate with an initiator. The ICP code takes charge of communication with external initiator via an external I/O port. It obtains information such as ICP modification parameters: the block the initiator wants to erase or program, the address byte, and the data the initiator may want to program. In addition, ICP code also controls communication with the delegable memory controller via a control register. It forwards the erase/program information received from the initiator to the delegable memory controller by forwarding erase/program commands to the control register where they are buffered. A code generator controlled according to the state of a flag set by the delegable memory controller provides instructions that are executed by the microprocessor during the ICP process. The microprocessor does not access the single flash memory device while receiving instructions from the code generator. After the code is executed by the delegable memory controller, the microprocessor returns to normal operation.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

Any feature or combination of features described herein are included within the scope of the present invention provided that the features included in any such combination are not mutually inconsistent as will be apparent from the context, this specification, and the knowledge of one of ordinary skill in the art. For purposes of summarizing the present invention, certain aspects, advantages and novel features of the present invention are described herein. Of course, it is to be understood that not necessarily all such aspects, advantages or features will be embodied in any particular embodiment of the present invention. Additional advantages and aspects of the present invention are apparent in the figures, detailed description, and claims that follow.

DETAILED DESCRIPTION OF THE PRESENTLY PREFERRED EMBODIMENTS

Reference will now be made in detail to the presently preferred embodiments of the invention, examples of which are illustrated in the accompanying drawings. Wherever possible, the same or similar reference numbers are used in the drawings and the description to refer to the same or like parts. It should be noted that the drawings are in greatly simplified form.

Although the disclosure herein refers to certain illustrated embodiments, it is to be understood that these embodiments are presented by way of example and not by way of limitation. The intent of the following detailed description, although discussing exemplary embodiments, is to cover all modifications, alternatives, and equivalents as may fall within the spirit and scope of the invention as defined by the appended claims. It is to be understood and appreciated that the structures and method steps described herein do not cover a complete detailed design for the manufacture of ICP devices. The present invention may be practiced in conjunction with various integrated circuit design and coding techniques that are conventionally used in the art, and only so much of the commonly practiced design details are included herein as are necessary to provide an understanding of the present invention.

The terms used in the detailed description are as generally used in the art. Specific definitions and drawing conventions are included to ensure the clarity of the specification but are not intended to be inclusive.

In the drawing figures, while not being limited, a line without arrows simply means a connection, whereas lines with arrows mean a flow of information in the direction of the arrow or arrows. Dashed lines indicate flash memory areas in a preferred embodiment.

Figure 1:
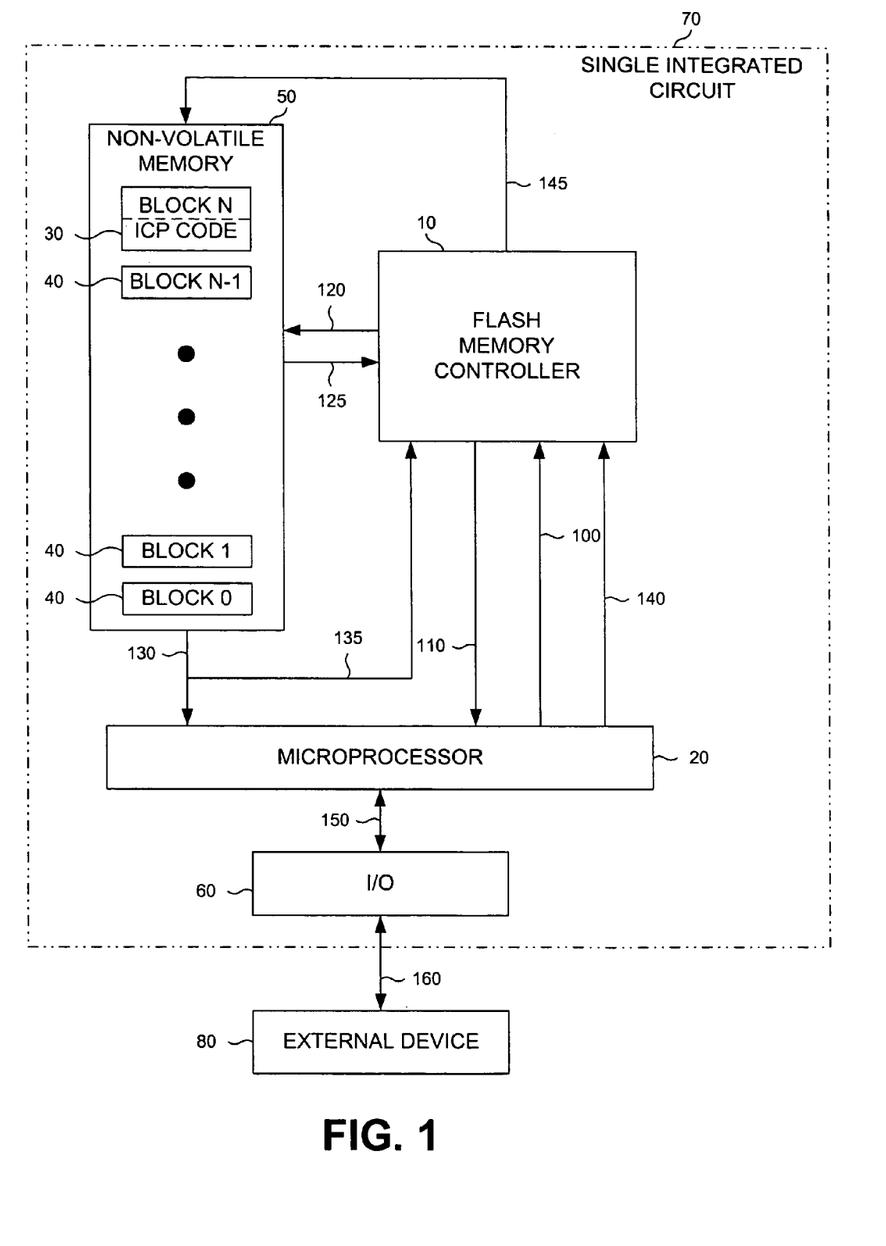
FIG. 1 is a general schematic block diagram of an ICP architecture including a discrete input/output (I/O) communication port in accordance with an aspect of the present invention.
Figure 2:
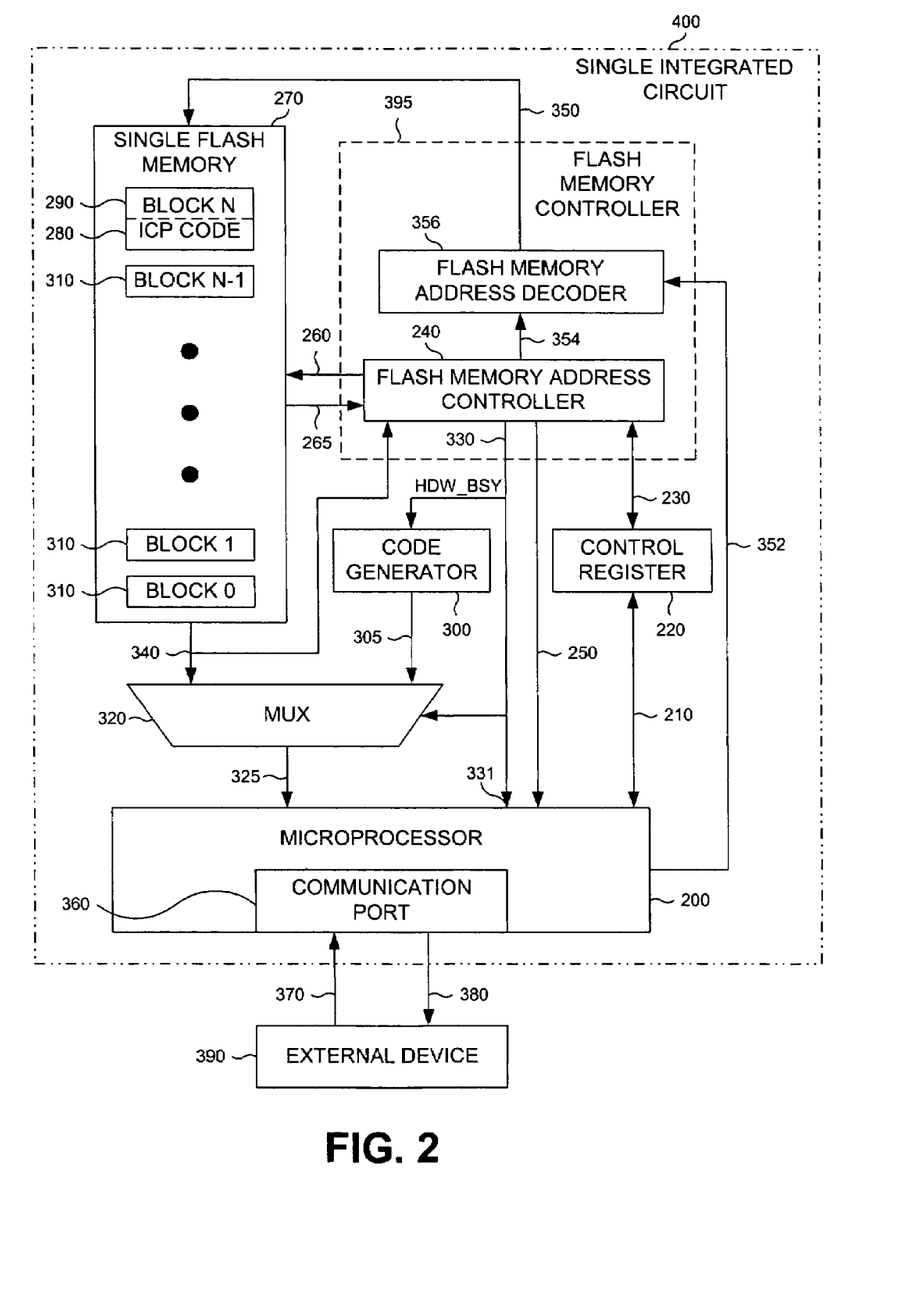
FIG. 2 is a schematic block diagram of an ICP architecture including a delegable flash memory controller, a control register, and a code generator in accordance with a preferred embodiment of the present invention.
Figure 3:
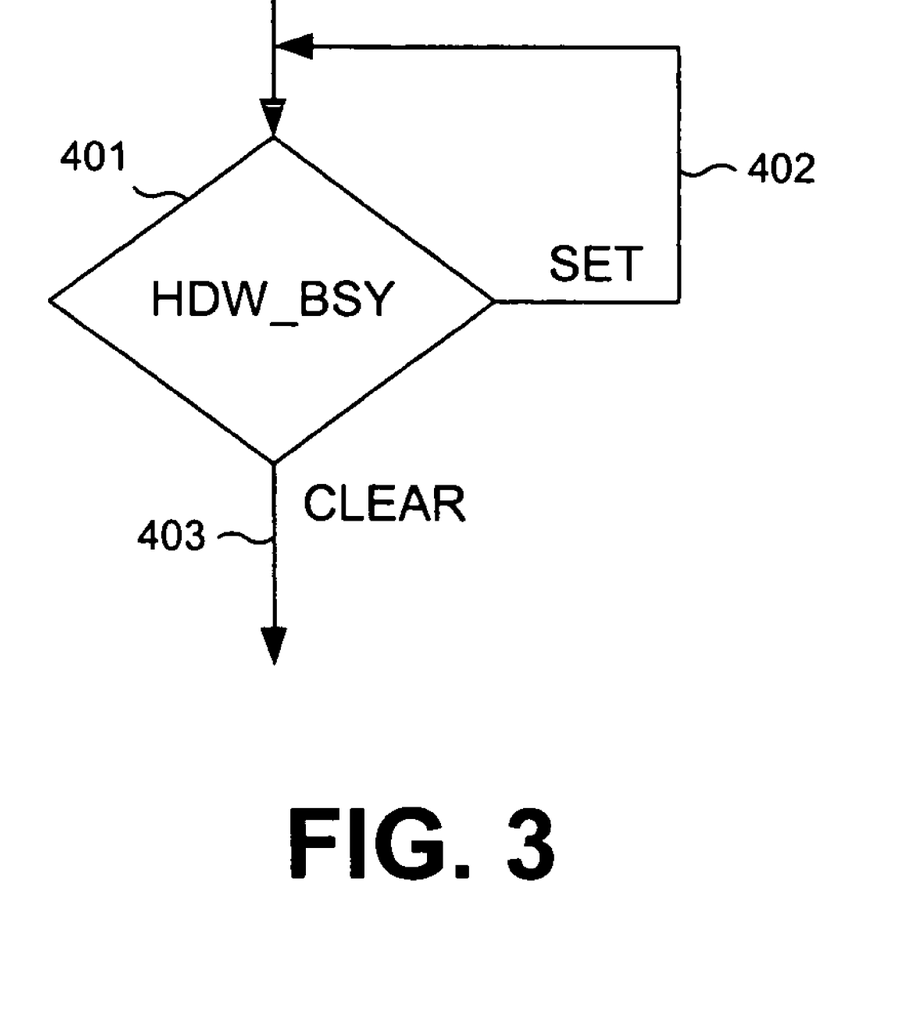
FIG. 3 is a flowchart of a control routine generated by the code generator during an ICP operation.
Figure 4:
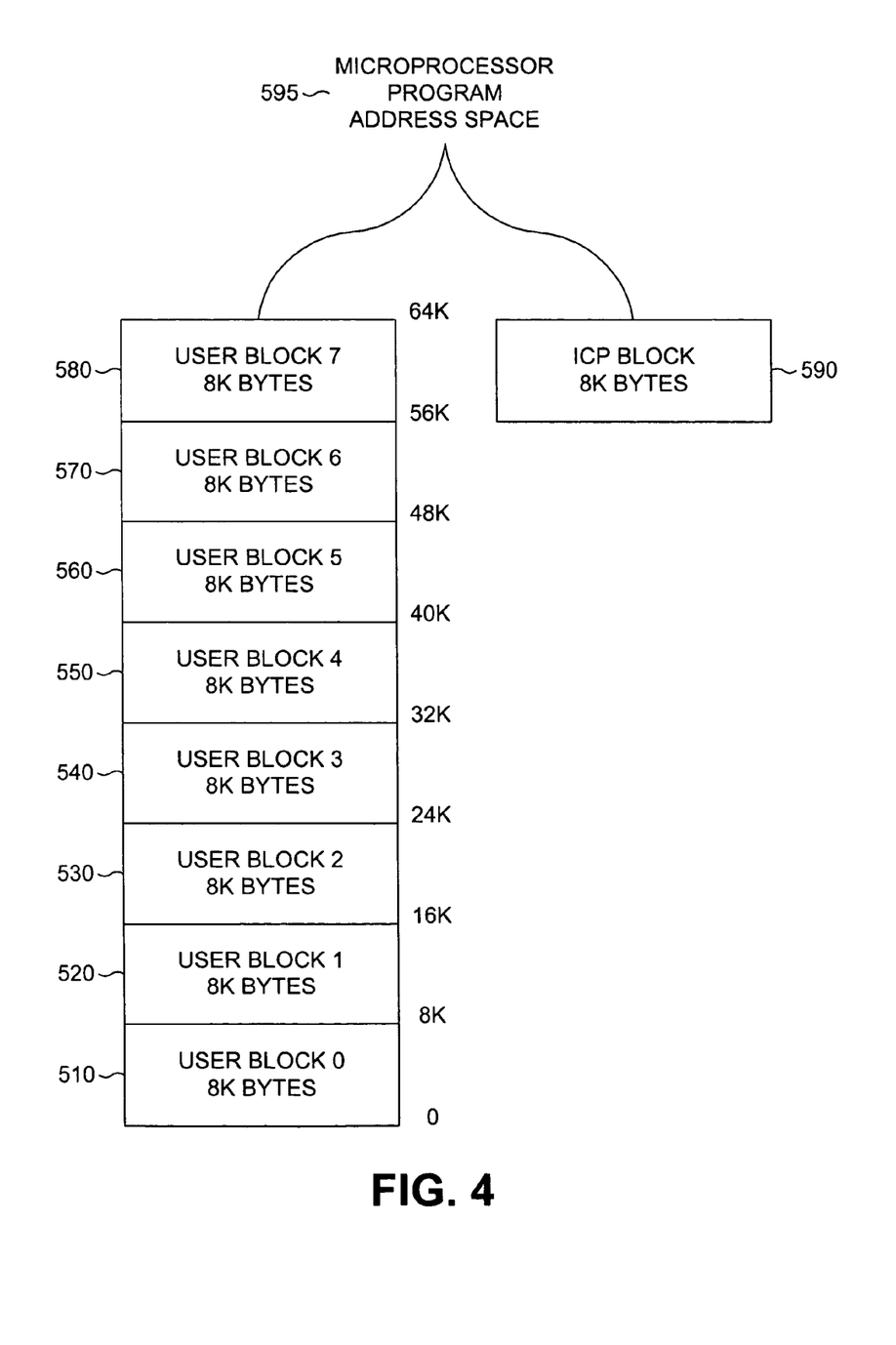
FIG. 4 is a diagram of the microprocessor address space in accordance with an aspect of the present invention.
Figure 5:
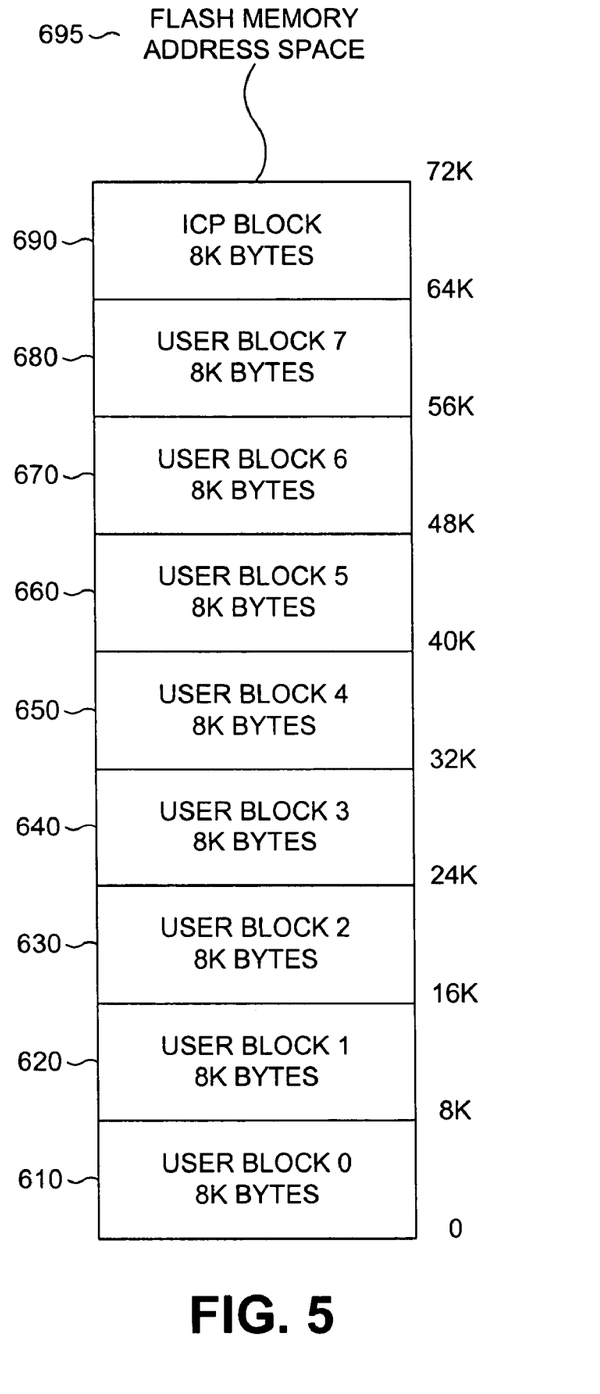
FIG. 5 is a diagram of the flash memory address space in accordance with an aspect of the present invention.
Figure 6:
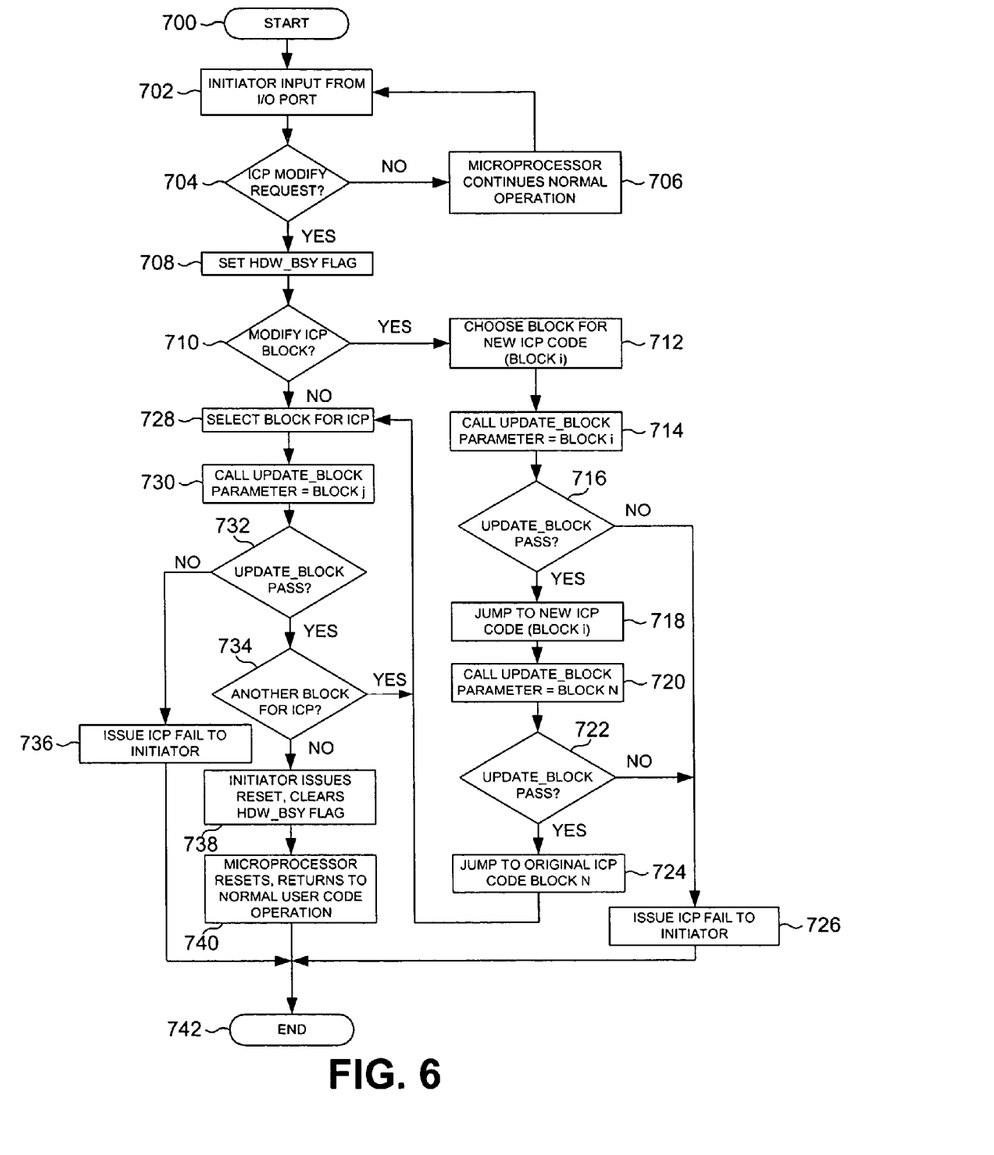
FIG. 6 is a flowchart of an ICP modify operation, according to the present invention.
Figure 7A:
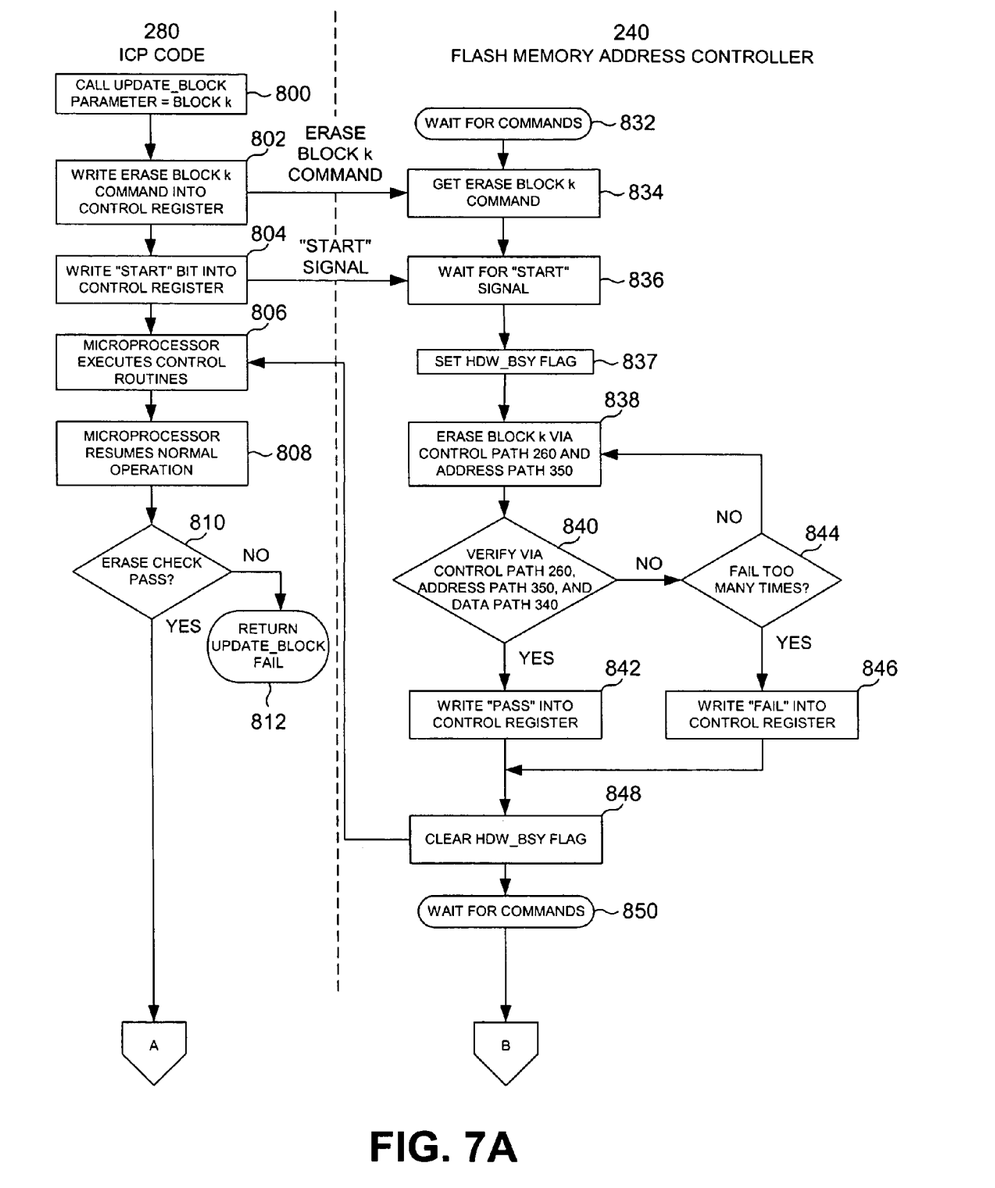
FIG. 7A is a flowchart of the delegable flash memory controller code erase operation which is called from FIG. 6.
Figure 7B:
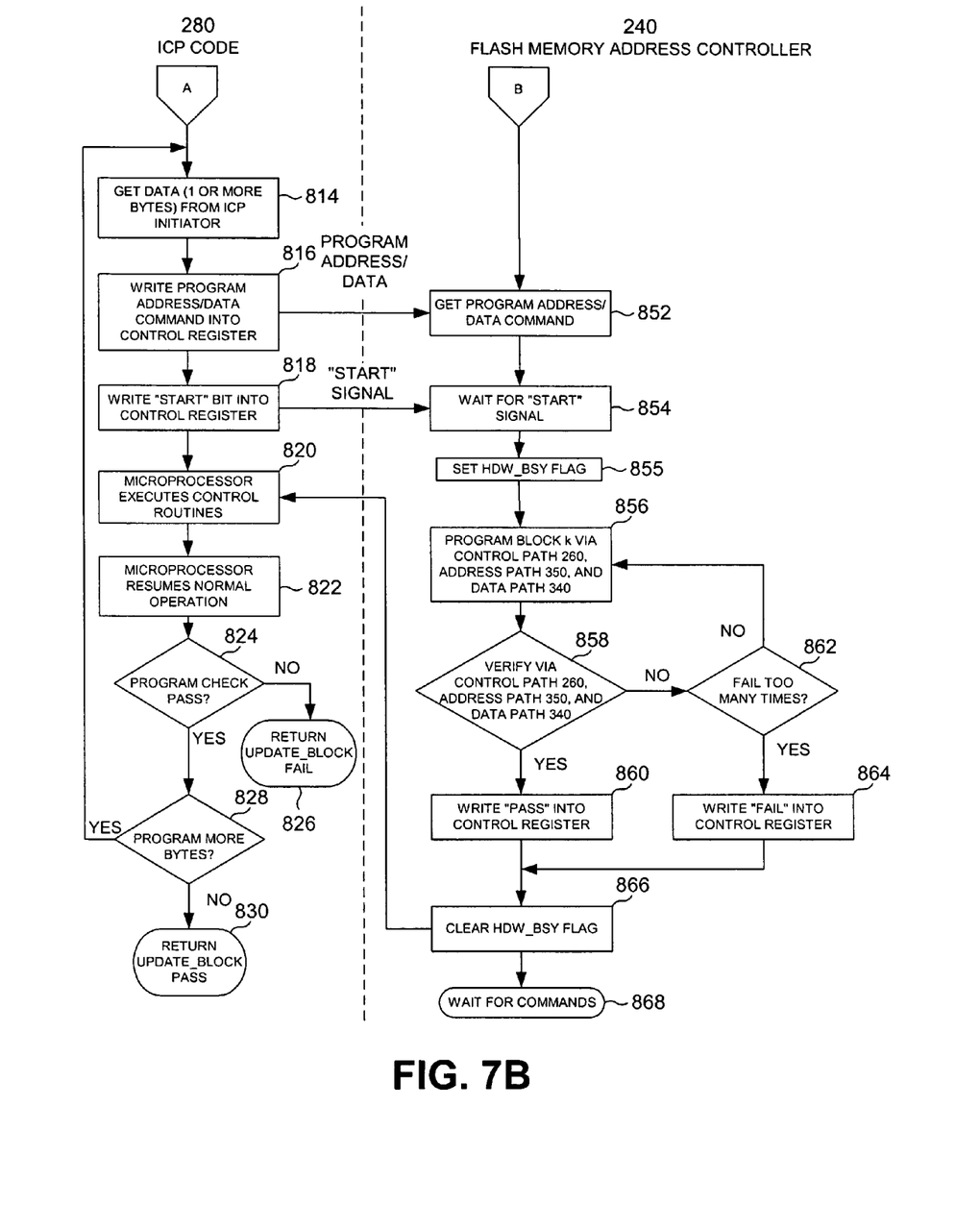
FIG. 7B is a flowchart of the delegable flash memory controller code program operation which is called from FIG. 6.

Referring more particularly to the drawings, FIG. 1 and FIG. 2 elucidate architectures of systems for in-circuit programming in accordance with aspects of the present invention. FIG. 3 is a flowchart describing operation of a code generator during in-circuit programming. FIG. 4 and FIG. 5 represent the microprocessor address space and flash memory space, respectively, in accordance with aspects of the present invention. FIGS. 6, 7A, and 7B are flowcharts depicting one embodiment of a number of steps involved in updating code contained in ICP memory according to an illustrated embodiment of the present invention. As used herein, the term code means one or more instructions or data implemented in the operation of a device.

FIG. 1 is a general schematic block diagram of an architecture according to the present invention for a single integrated circuit 70 supporting ICP. The architecture of the single integrated circuit 70 includes a microprocessor 20 that may execute a program of instructions. A communication means is implemented in the illustrated embodiment as a distinct I/O communication port 60 for receiving digital data from and transmitting digital data to an external device 80. Digital data can include computer instructions, numerical values, alphanumeric symbols, or any other information, including addresses, that is digitally encoded in binary or other digital format. In this context, the term port refers to an interface to a component or device that supports a one-way or bidirectional exchange of data.

The term communication means may refer to one, several, or any combination of ports either fixed in function or with the function controlled by, for example, the code in the memory, and includes but is not limited to interfaces such as those supporting the Bluetooth™ standard, Infrared Data Association (IrDA) standard, cable, Intel/Microsoft/Digital standard Universal Serial Bus (USB), the Philips Electronics/Computer Access Technology standard Access Bus, the Apple Computer/IBM/AT&T standard Geoport, the Apple Computer/Texas Instruments/NCR standard 1349 FireWire, the Internet, a serial port (such as RS-232C), or a parallel port.

The I/O communication port 60 is connected to an external device 80 via a data path 160. The external device 80 can be any device that receives or transmits digital data, such as a machine under control, a network, another input/output device, a data translator or interface, or a protocol translator, and it may be a device that causes the ICP code or user code to be modified.

The integrated circuit 70 further includes a single non-volatile memory 50 comprising non-volatile memory cells on the integrated circuit 70 and a memory controlling means shown as a delegable flash memory controller 10. As used herein, the term delegable memory controller refers to a controller to which program and erase tasks may be delegated. For example, the term can refer to a flash memory controller that is delegated to do program and erase tasks. In one embodiment, the flash memory controller is a finite-state machine that implements flash program, erase and verify tasks. In the illustrated embodiment, the memory controlling means is a simple logic controller that is specialized for the purpose of updating ICP code and/or user code within the non-volatile memory 50, thereby eliminating a need for a second memory and/or freeing resources of and attenuating a prolonged operation of the microprocessor 20.

The non-volatile memory 50 may store and send instructions for execution to the microprocessor 20 via a data path 130. As used herein, the term non-volatile memory may include non-volatile memory formed for example of electrically erasable programmable memory cells or formed by floating gate or trapped charge memory cells, also referred to as flash memory. The microprocessor 20 interfaces with the non-volatile memory 50 via an instruction address path 140. The microprocessor 20 instruction address path 140 interfaces with the delegable flash memory controller 10. The delegable flash memory controller 10 decodes the instruction address and the sends it to the non-volatile memory 50 via address path 145.

As will be shown in more detail with reference to FIG. 3, the microprocessor address space occupies a range of 0~64K, address 0×0000~0×FFFF. As shown in FIG. 5, a non-volatile memory 50 address space occupies a range of 0~68K, where 64K~68K comprises a block of ICP code 30. In normal user code operation, the microprocessor's address is decoded to the 0K~64K user block. While in ICP mode operation, when the microprocessor issues an address between 60K~64K, 0×E000~0×FFFF, the delegable flash memory controller 10 decodes it to 64K~68K, 0×10000~0×1FFFF, and the ICP code 30 is executed. In addition, when erase/program tasks are being implemented by the delegable flash memory controller 10, the address path 145 is also controlled by the delegable flash memory controller 10 to send the erase/program address to the nonvolatile memory 50.

The non-volatile memory 50 comprises 0 through N-1 user code blocks 40, and block N comprises the ICP code 30. As used herein, the term ICP code block refers to a portion of memory comprising code that contains a set of instructions used to program a microprocessor. The ICP code block 30 contains all of the ICP code, including code that may communicate with an initiator as well as erase/program command handler code. The ICP code may also cause the microprocessor 20 to send commands to the delegable flash memory controller 10 to perform read/erase/program/verify tasks. Additionally, as used herein, the term user code block or blocks refers to a portion of memory that may contain a set of instructions used to control or communicate with a microprocessor or an external device. User code blocks 0 through block N-1 can be employed by a user of this single integrated circuit 70 to program/provide code for a specific application and for facilitating communication with the external device 80. Instructions within the user code blocks 40 may also contain "null code" which is no code at all.

In accordance with a feature of the present invention, the microprocessor 20 enables (or delegates to) the delegable flash memory controller 10 tasks such as, in particular, responding to an in-circuit program update command (i.e., a modification instruction) which may erase and/or write non-volatile memory cells of the non-volatile memory 50 through an erase/write path 120. The delegable flash memory controller 10, in turn, receives indications from the non-volatile memory 50 by signal path 125 and sends data to the microprocessor 20 by data path 110. The microprocessor 20 may send data to the delegable flash memory controller 10 by path 100 and may exchange data with the I/O communication port 60 by a bidirectional data path 150.

FIG. 2 is a schematic block diagram of an ICP architecture formed on a single integrated circuit 400 in accordance with a preferred embodiment of the present invention. The ICP architecture includes a microprocessor 200, which may execute a program of instructions, and which includes a communication port 360 that receives digital data from an external device by input path 370 and transmits digital data to an external device 390 via data path 380. The microprocessor 200 also includes communication paths (not shown) for interrupts and other signals generally used to coordinate and synchronize communications through, for example, the communication port 360 as known to those skilled in the art. In particular, the microprocessor 200 comprises an input port 331 that is more particularly described below. The microprocessor 200 is operatively coupled to a control register 220 and a delegable flash memory controller 395 to which the microprocessor 200 may be configured to delegate ICP operations. The delegable flash memory controller 395 comprises a flash memory address decoder 356 and a flash memory address controller 240. As mentioned above, the term delegable is intended to mean capable of being assigned to perform memory control operations when used in the context of the delegable memory controller.

The microprocessor 200 can exert control over the flash memory address controller 240 by writing to the control register 220 using a bidirectional data path 210. Control commands received from the microprocessor 200 on bidirectional data path 210 may be stored in the control register 220 and presented to the flash memory address controller 240 on bidirectional data path 230. Conversely, the flash memory address controller 240 may use bidirectional data path 230 to write status codes into the control register 220. The microprocessor 200 may read status codes from the control register 220 via bidirectional data path 210. The flash memory address controller 240 is operatively coupled to the flash memory address decoder 356 and can pass memory addresses to the flash memory address decoder 356 by address path 354. The microprocessor 200 also is able pass instruction addresses to the flash memory address decoder 356 by using address path 352. The microprocessor 200 can receive notifications from the flash memory address controller 240 on another data path 250.

According to an aspect of the present invention, a code generator 300 may be operatively connected between the flash memory address controller 240 and the microprocessor 200 by an instruction path 305 that is connected to an input of a multiplexer 320. Multiplexer 320 operatively connects to the microprocessor 200 using an instruction path 325. The flash memory address controller 240 controls the code generator 300 through a hardware-busy (HDW_BSY) flag 330 that also is connected directly to the microprocessor 200 on input port 331. The HDW_BSY flag 330, which may assume a first state referred to as SET and a second state referred to as CLEAR, further functions as a control input to the multiplexer 320. The flash memory address controller 240 in the delegable flash memory controller 395 activates the code generator by setting the HDW_BSY flag 330, i.e. by placing the HDW_BSY flag 330 into the SET state. Output from the code generator 300 appearing on instruction path 305 is directed by the multiplexer 320 to instruction path 325 when the HDW_BSY flag 330 is set. As further described below with reference to FIG. 3, the microprocessor 200 does not receive instructions from the single non-volatile memory device 270 when the code generator 300 is active. The ICP architecture further includes a single flash memory device 270 comprising non-volatile memory cells on the integrated circuit that may store and send instructions for execution to the microprocessor 200 via data path 340. Data path 340 connects to an input of the multiplexer 320. The multiplexer 320 directs instructions appearing on data path 340 to data path 325 when the HDW_BSY flag 330 is cleared, i.e., when the HDW_BSY flag 330 is in the CLEAR state. Instructions to be sent to the microprocessor 200 are selected according to a memory address passed to the single flash memory device 270 from the flash memory address decoder 356 on an address path 350.

As presently embodied, the communication port 360 within the microprocessor 200 may include one or more input ports, output ports, or input/output ports. In comparison to the I/O communication port 60 of FIG. 1, it is noted that in some applications the discrete I/O communication port 60 of FIG. 1 may not be needed. While greater external device interface flexibility may be provided with a communication means such as the I/O communication port 60 of FIG. 1, the I/O capabilities of the communication port 360 incorporated within the microprocessor 200 may be sufficient for many relatively simple or predictable interfaces with external devices. Moreover, the configuration of FIG. 2 may consume less chip real estate and less power. However, while in the illustrated embodiment the communication port 360 is integrally formed with the microprocessor 200, other configurations may be implemented in modified embodiments such as the utilization of a communication means as defined in connection with FIG. 1 coupled to the microprocessor 200.

In the illustrated embodiment, the single flash memory device 270 comprises N+1 blocks. Block N 290 is used for storing the ICP code 280, and other blocks 310 contain user code. As with the ICP code 30 in FIG. 1, the ICP code 280 controls the steps required to read, erase, and/or program and verify code, including, for example, the ICP code, as well as user code. The ICP code is also used to communicate with or control an external device 390.

Bidirectional data path 230 interconnects the delegable flash memory controller 395 and the control register 220. The flash memory address controller 240 controls the HDW_BSY flag 330, capable of being monitored by the microprocessor 200 on input port 331, to notify the microprocessor 200 when a code modification is complete. The flash memory address controller 240 is able to receive data from the single flash memory device 270 via data path 340. The flash memory address controller 240 is operatively connected with the flash memory address decoder 356 by address path 354 which is connected to the single flash memory device 270 by address path 350. The control path 260 controls the single flash memory device 270 to perform a read, program, or erase step. The control path 265 carries a signal indicating that the single flash memory device 270 has completed an erase/program step.

In the prior-art U.S. Pat. No. 5,901,330 and U.S. Pat. No. 6,151,657, when the microprocessor programs or erases the flash memory, the microprocessor must fetch the instruction codes (ICP codes). This requires two memory blocks in the form of either one flash memory and one ROM or two flash memories. If the ICP code or erase/program handler is located in the same flash memory that will be programmed or erased, the microprocessor can not access code from the flash memory and erase or program it at the same time without for example generating I/O conflicts.

In accordance with an aspect of the present invention, the microprocessor 200 I/O conflicts are prevented by the code generator 300, which generates control routines to be executed by the microprocessor 200 during these operations. For example, the flash memory address controller 240 may receive a command on bidirectional data path 230 from the control register 220 indicating that an ICP operation is to be performed. The flash memory address controller 240 then sets the HDW_BSY flag 330 that (a) causes the code generator 300 to generate control routines and to present them on instruction path 305 and (b) causes multiplexer 320 to direct instructions on instruction path 305 to the microprocessor 200 via instruction path 325. Further, the microprocessor 200 is able to observe the state of the HDW_BSY flag 330 directly on input port 331. By causing the code generator 300 to generate control routines that do not require the microprocessor 200 to use the single flash memory 270, the delegable flash memory controller 395 is able to access the single flash memory device 270 and to read code from the single flash memory device 270 via data path 340 without I/O conflicts. Conversely, when the microprocessor 200 executes ICP or user code, it obtains the code via data path 340. At that time, the flash memory address controller 240, is in a "waiting for command" or "waiting for start bit" state, which does not cause the flash memory address controller 240 to set the HDW_BSY flag 330. Data path 340, therefore, is available for the microprocessor 200 and single flash memory device 270 to use without I/O conflicts according to the state of the HDW_BSY flag 330.

The control routines produced by the code generator 300 may comprise a very short set of instructions that, according to an aspect of the present invention, do not require the microprocessor 200 to access the single flash memory device 270. For example, according to an illustrated embodiment, the instructions may correspond to the flowchart shown in FIG. 3. At step 401 of this example, the HDW—BSY flag 330 is tested. If The HDW—BSY flag 330 is set (as is the case when the flash memory address controller 240 has a need to perform an ICP operation on the single flash memory device 270), step 402 of the example method causes step 401 to be repeated. If the HDW—BSY flag 330 is cleared (as is the case when the flash memory address controller 240 has no need to access the single flash memory device 270) then execution continues normally at step 403. In the latter instance, the microprocessor 200 may receive normal instructions from the single flash memory device 270. The instructions that implement the control routines may comprise only a few bytes (e.g., 2-4 bytes) of code and may be stored in a correspondingly very small amount of read-only memory located in the code generator 300.

By locating both the ICP code 280 and user code 310 within a single flash memory 270, both sets of code are able to share one set of high voltage pumping circuitry, sense amplifier circuitry, and I/O flash memory ports rather than multiple sets as would be required with multiple memory devices. As used herein, the term high voltage pumping circuitry refers to a single circuit or separate high voltage pumping and high voltage circuits. The shared I/O flash memory ports exchange data with microprocessor 200 in FIG. 2, sending data by path 340 and receiving instruction address data from the flash memory address decoder 356 via data path 350. The shared I/O flash memory ports exchange control signals with the flash memory address controller 240 in FIG. 2 via control paths 260 and 265.

By communicating with the control register 220 via the bidirectional data path 210, the microprocessor 200 can enable the flash memory address controller 240 and delegate control to the delegable flash memory controller 395 via, for example, the control register 220. As presently embodied, the control register 220 is an integrated circuit component that latches, buffers, or otherwise retains a value in memory until it is emptied.

The microprocessor 200 inputs instruction addresses via address path 352 to the flash memory address decoder 356, which decodes the addresses and sends them to the single flash memory device 270 via data path 350. The flash memory address decoder 356 will chose the correct address to let the microprocessor fetch ICP code or user code according to whether an ICP code modify request has been received or not, respectively, as also detailed in the descriptions of FIG. 1, FIG. 4, and FIG. 5.

The microprocessor receives instructions from the single flash memory device 270 via data path 340. During an ICP function, such as may be evoked by an in-circuit program update command (i.e., a modification instruction) causing the microprocessor 200 to execute instructions within the ICP code block 290, erase/program instructions from, for example, the ICP code block 290 are delegated by the microprocessor 200 to the delegable flash controller 395, e.g., the flash memory address controller 240, control register 220, and flash memory address decoder 356, for implementation. Erase/program instructions may originate with the external device 390. The flash memory address controller 240 receives commands corresponding to the erase/program instructions via the control register 220, and proceeds, for example, to erase non-volatile memory cells of the single flash memory device 270 and/or program the cells with, for example, data from the external device 390.

In the embodiments illustrated in FIG. 1 and FIG. 2, only a single non-volatile memory device is illustrated. Alternative embodiments may include more than one non-volatile memory device, providing, for example, additional flexibility in the design and implementation of the overall system and/or the ICP system.

FIG. 4 shows an exemplary diagram of a microprocessor program address space 595 . This address space is divided into a plurality of blocks. User block 0, 510, extends from address 0 to address 8K. User block 1, 520, extends from address 8K to address 16K. User block 2, 530, extends from address 16K to address 24K. User block 3, 540, extends from address 24K to address 32K. User block 4, 550, extends from address 32K to address 40K. User block 5, 560, extends from address 40K to address 48K. User block 6, 570, extends from address 48K to address 56K. User block 7, 580, extends from address 56K to address 64K. ICP block, 590, extends from address 56K to address 64K.

The address space of an 8051 microprocessor, for example, ranges from 0 to 64K (0x0000~0xFFFF). When the microprocessor is in ICP mode, the address 56K~64K (0xE000~0xFFFF) is decoded to the ICP block (block N), 590, rather than the user code block 7 (block N-1), 580. Thus, in the illustrated embodiment, only one block is used for storing ICP, and the address decoder chooses the correct address to let the microprocessor fetch user code or ICP code according to whether it is in ICP mode or not FIG. 5 shows an exemplary diagram of a portion of flash memory address space 695 ranging from 0 to 72K. This address space is divided into a plurality of independently erasable blocks of flash memory. User block 0, 610, extends from address 0 to address 8K. User block 1, 620, extends from address 8K to address 16K. User block 2, 630, extends from address 16K to address 24K. User block 3, 640, extends from address 24K to address 32K. User block 4, 650, extends from address 32K to address 40K. User block 5, 660, extends from address 40K to address 48K. User block 6, 670, extends from address 48K to address 56K. User block 7, 680, extends from address 56K to address 64K. ICP block, 690, extends from address 64K to address 72K.

Again, taking an 8051 microprocessor, for example, the address space ranges from 0 to 64K (0x0000~0xFFFF). When in ICP mode, the microprocessor sends the ICP address 0xE000~0xFFFF via address path 352 to the flash memory address decoder 356. The flash memory address decoder 356 decodes the address to 0x10000~0x11FFF to enable the microprocessor to access the ICP code of the ICP block 690 (block N, 290 in FIG. 2), extending from flash memory address 64K to address 72K rather than the user block 7, 680, (block N-1, 310 in FIG. 2).

FIGS. 6, 7A, and 7B are flowcharts depicting ICP erase/program/verify operations involved in an in-circuit programming process in accordance with an illustrated embodiment of the present invention. FIG. 6 presents the steps for code modify, FIG. 7A presents an erase operation, and FIG. 7B presents a program operation. FIGS. 7A and 7B are each divided into two columns. The first column, labeled "280 ICP CODE" represents the activities enacted by the ICP code 280 of FIG. 2. The second column, labeled "240 FLASH MEMORY ADDRESS CONTROLLER" represents the actions of the flash memory address controller 240 of FIG. 2.

The flowchart of FIG. 6 represents an exemplary method for in-circuit programming of an integrated circuit having a microprocessor 200 with a communication port 360 for interchanging data with an external device 390, a single flash memory device 270 of non-volatile memory cells, and a delegable flash memory controller 395 for relieving the microprocessor 200, at least partially, of in-circuit code erase/program/verify tasks to be performed in connection with the single flash memory device 270. In the illustrated embodiment, the process of in-circuit programming can be accomplished beginning at step 700. An initiator input is received at step 702 from an external device 390 via the communication port 360 of the microprocessor 200. At step 704, a determination is made as to whether the initiator input pertains to or contains instructions for an ICP or a user code modification task. If the initiator input does not contain an ICP or user code modification instruction, then in the illustrated embodiment, the method branches at step 706 back up to step 702 while the microprocessor continues normal operation. In this condition, the delegable flash controller 395 is in the "waiting for command" or "waiting for start bit set" state, which leaves the data path 340 available for use by the microprocessor 200 to execute user code or ICP code.

If the initiator input does contain an ICP or user code modification instruction, the method moves from step 704 to step 708. At step 708, the microprocessor 200 delegates control to the flash memory address controller 240 by writing a command into the control register 220. In response, the flash memory address controller 240 sets the HDW_BSY flag 330. Setting the HDW_BSY flag 330 causes the code generator 300 to pass control routines that do not require accessing the single flash memory 270 on instruction path 305 to the multiplexer 320. When the HDW_BSY flag 330 is set, the multiplexer 320 passes the control routines to the microprocessor 200 on instruction path 305. The microprocessor 200 also is able to monitor the value of the HDW_BSY flag 330 on port 331. Through this approach, the microprocessor 200 does not access the single flash memory 270 when the HDW_BSY flag 330 is set. The delegable flash memory controller 395 is therefore able to use the data path 340 to read from the single flash memory 270 and further is able to access the single flash memory 270 through control paths 260 and 265 and through address path 350 without conflict with the microprocessor 200. In various embodiments, the HDW_BSY flag 330 may be set upon the occurrence of any event connected with the delegation of the modification instructions to the delegable flash memory controller 395.

During code modification, the ICP code 280 takes control of communications with the flash memory address controller 240 by way of the control register 220. The flash memory address controller 240 may invoke an automatic erase algorithm and/or an automatic program algorithm as will be presented in upcoming portions of the flowcharts. The flash memory address controller 240 communicates with the single flash memory 270 by data path 340, address path 350 (via address path 354 and flash memory address decoder 356), and control paths 260 and 265 when it is performing these algorithms. A complete modification action may comprise several erase/program steps. The flash memory address controller 240 controls execution of these erase/program/verify steps.

At step 710, the program branches to step 712 if the ICP block 280 is to be modified or to step 728 if the ICP block is not to be modified. If the ICP block 280 is not to be modified at step 728, a routine entitled UPDATE_BLOCK is called at step 730 with its parameter=block j. Following the UPDATE_BLOCK of step 730, the operation is verified for pass or fail at step 732. If the UPDATE_BLOCK failed, an ICP FAIL is issued to the initiator at step 736. The operation then proceeds to end state 742. Should the UPDATE_BLOCK pass, the operation proceeds to step 734 to determine if there is another block for ICP. If there is, the operation returns to step 728. If not, the operation proceeds to step 738 for the initiator to issue a reset. At step 740, the microprocessor 200 receives a reactivation instruction and executes a reset routine, which has the effect of clearing the HDW_BSY flag 330. The microprocessor 200 then returns to normal user code operation leading to end state 742.

If the ICP block is to be modified at step 710, the program branches to step 712 to select a block for the new ICP code, in this case block i. UPDATE_BLOCK is called at step 714 with its parameter=block i. The operation is verified for pass or fail at step 716. If the UPDATE_BLOCK failed, an ICP FAIL is issued to the initiator, now at step 726, and the operation proceeds to the end state 742. If the UPDATE_BLOCK passed, at step 718 the operation jumps to the new ICP code at block i. UPDATE_BLOCK is again called at step 720 with parameter=block N, the location of the ICP code as in 290 of FIG. 2. Another pass/fail check is now performed at step 722. A failure leads to step 726 where an ICP FAIL is issued to the initiator, and the operation proceeds to end state 742. A pass leads to step 724, which jumps operation to the original ICP code block N. The operation then returns to step 728 to select a block for ICP and proceeds to the end state as just described.

The flowchart of FIG. 7A presents erase operations involved in an exemplary in-circuit programming process. UPDATE_BLOCK is called by the ICP code 280 of FIG. 2 at step 800 with parameter=block k. At step 802, a write erase block k command is entered into the control register 220 of FIG. 2. At this point, the flash memory address controller 240 has been waiting for commands at step 832. From the control register 220, it gets the erase block k command at step 834. The flash memory address controller 240 then waits for a "start" signal from the ICP code 280 at step 836. The "start" signal is initiated by the ICP code at step 804. According to an exemplary embodiment, initiating the "start" signal may cause the flash memory address controller 240 to set the HDW_BSY flag 330 at step 837, causing the microprocessor 200 to execute control routines at step 806 according to instructions received from the code generator 300. Execution of control routines continues until the HDW_BSY flag 300 is cleared (following step 848, infra) at step 808.

At step 838, the flash memory address controller 240 initiates an automatic erase algorithm to erase block k through the control path 260 and address path 350 (by way of address path 354 and flash memory address decoder 356) of FIG. 2. The erase operation is validated at step 840 by the control path 260, data path 340, and address path 350 (by way of address path 354 and flash memory address decoder 356) of FIG. 2. If the operation failed, step 844 determines if it has failed too many times. If the operation failed, but not too many times, the operation returns to step 838. If, however, the erase operation has failed too many times, the operation branches to step 846 where a FAIL is written into the control register 220 and the flash memory address controller 240 at step 848 clears the HDW_BSY flag 330, releasing the microprocessor 200 from control of the code generator 300 and allowing the microprocessor 200 to resume normal operation at step 808. Meanwhile, the flash memory address controller 240 waits for further commands at step 850.

If the erase operation passed, the operation branches from step 840 to step 842 where PASS is written into the control register 220. At the next step 848, the flash memory address controller 240 clears the HDW_BSY flag 330, causing the microprocessor 200 to resume normal operation at step 808. Upon resuming normal operation, the microprocessor 200 receives, upon completion of the in-circuit programming update function, an indication that the in-circuit programming update function has been completed. The flash memory address controller 240 then waits for commands at step 850. In the illustrated embodiment, the waiting continues at point B in the flowchart of FIG. 7B.

After sending the "start" signal to the flash memory address controller 240 at step 804, the ICP code 280 ceases operating with the microprocessor 200 because the microprocessor 200 is executing control routines provided by the code generator 300 at step 806. (That is, the HDW_BSY flag 330 was set by the flash memory address controller 240 at step 837.) Once the HDW_BSY flag 330 is cleared at step 848, microprocessor 200, upon resuming normal operation at step 808, checks the erase pass or fail state at step 810. If the erase failed, UPDATE_BLOCK FAIL is returned to the initiator at step 812. If the erase passed, the operation continues to point A. In the illustrated embodiment, operation continues at point A in the flowchart of FIG. 7B.

FIG. 7B represents program operations involved in an in-circuit programming process. In the illustrated embodiment, following the erase operations of FIG. 7A, code modification may continue with the programming steps of FIG. 7B at points A and B. Point A designates activities enacted by the ICP code 280 of FIG. 2, being in the left column of the flowchart. The right or second column, labeled "240 FLASH MEMORY ADDRESS CONTROLLER," represents actions of the flash memory address controller 240 of FIG. 2. In the illustrated embodiment, these actions of the flash memory address controller 240 proceed from point B. Although the illustrated embodiment of FIG. 7B is shown continuing from FIG. 7A, other embodiments may exist wherein program flow continues from other functions or steps.

Once the ICP code 280 has checked that the erase passed, operation continues at step 814 where the ICP code 280 obtains one or more bytes of data from the ICP initiator. The ICP code 280 then causes writing of the program address/data command to the flash memory address controller 240 via the control register 220 at step 816. The flash memory address controller 240 receives the program address/data command at step 852, and then waits for a "start" signal from the ICP code 280 at step 854. After the ICP code 280 has written the program address/data, it writes a "start" bit into the control register 220 at step 818. Writing the "start" bit into the control register 220 causes the flash memory address controller 240 to set the HDW_BSY flag 330 at step 855, causing the microprocessor 200 to begin executing control routines according to instructions received from the code generator 300 at step 820.

Once the "start" bit has been written into the control register 220, the flash memory address controller 240 at step 856 programs block k via control path 260, address path 350 (through address path 354 and the flash memory address decoder 356), and data path 340 by initiating an automatic program algorithm.

After the flash memory address controller 240 has programmed block k, the program operation is verified at step 858 by control path 260, address path 350 (again through address path 354 and the flash memory address decoder 356), and data path 340. If the verify fails, operation branches to step 862.

At step 862, if the operation has failed too many times, operation is branched to step 864 where a FAIL indication is written into the control register 220. The HDW_BSY flag 330 is then cleared at step 866. Consequently, the microprocessor 200 resumes normal operation at step 822, and the flash memory address controller 240 proceeds to step 868 to wait for commands. Once the microprocessor 200 has resumed normal operation at step 822, the ICP code 280 proceeds to step 824 to check whether the program operation has passed or failed. If the programming has failed, as is the case in this flowchart branch, the ICP code 280 returns UPDATE_BLOCK FAIL to the initiator at step 826.

If, on the other hand, the determination at step 862 is that the program operation has not failed too many times, the operation returns to step 856 to reprogram block k. If the program verify passes at step 858, the operation continues to step 860 where PASS is written into the control register 220. The HDW_BSY flag 330 is then cleared at step 866. The microprocessor 200 thus resumes normal operation when the in-circuit programming update function has been completed, and the flash memory address controller 240 proceeds to step 868 to wait for commands.

In this case, once the microprocessor 200 has resumed normal operation at step 822, the ICP code 280 proceeds to step 824 to check whether the program operation has passed or failed. If the programming failed, as described above, the ICP code 280 returns UPDATE_BLOCK FAIL to the initiator at step 826. If the programming passed, as in this instance, the ICP code 280 branches to step 828 wherein a determination is made as to whether there are more bytes to program. If there are more bytes to program, the ICP code 280 returns to point A, prior to step 814. If there are no more bytes to be programmed, the ICP code 280 branches to step 830 and returns UPDATE_BLOCK PASS to the initiator.

It will be understood by those skilled in the art that the structures and method steps of the invention described in the foregoing preferred embodiments facilitate the implementation of an ICP integrated circuit. The embodiments are provided as examples of the invention described herein, and the invention is not limited to these examples. Multiple variations and modifications of the disclosed embodiments will occur, to the extent not mutually exclusive, to those skilled in the art upon consideration of the foregoing disclosure. Additionally, other combinations, omissions, substitutions and modifications will be apparent to the skilled artisan in view of the disclosure herein. Accordingly, the present invention is not intended to be limited by the disclosed embodiments, but is to be defined by reference to the appended claims.

What is claimed is:

1. An apparatus for in-circuit programming of an integrated circuit, comprising:

a single non-volatile memory device comprising non-volatile memory cells on the integrated circuit that store instructions for execution by a microprocessor, the single non-volatile memory device containing in-circuit programming code for programming the single non-volatile memory device and user code for facilitating communication with an external device, wherein the in-circuit programming code can be reprogrammable and stored in a predetermined location of the single non-volatile memory device, and the user code can be stored in a location of the single non-volatile memory device that is different from the predetermined location;

a microprocessor configured to input instruction addresses to the single non-volatile memory device and to receive instructions from the single non-volatile memory device;

a delegable memory controller operatively coupled between the microprocessor and the single non-volatile memory device, the delegable memory controller being configured to receive an in-circuit program update command and to perform an in-circuit programming update function on the non-volatile memory cells of the single non-volatile memory device, whereby the microprocessor is relieved of performing the in-circuit programming update function; and a code generator operatively connected between the delegable memory controller and the microprocessor, the code generator being capable of providing instructions to be executed by the microprocessor;

wherein the single non-volatile memory device, the microprocessor, the delegable memory controller, and the code generator are on a same single chip;

wherein the microprocessor is configured to execute at least one control routine, which does not require the microprocessor to use the non-volatile memory device, provided by the code generator while the delegable memory controller performs the in-circuit programming update function.

2. The apparatus as set forth in claim 1, wherein the non-volatile memory cells in the single non-volatile memory device comprise electrically erasable programmable read only memory cells.

3. The apparatus as set forth in claim 1, wherein:

the apparatus further comprises a control register;

the single non-volatile memory device comprises a single flash memory device;

the delegable memory controller comprises a flash memory address controller coupled between the control register and the single flash memory device; and the delegable memory controller comprises a flash memory address decoder operatively coupled to the flash memory address controller, the microprocessor, and the single flash memory device.

4. The apparatus as set forth in claim 1, wherein the single non-volatile memory device comprises a plurality of separately erasable blocks of the non-volatile memory cells, and the in-circuit programming code is stored in the predetermined location of a particular block or group of blocks in the plurality of separately erasable blocks of the non-volatile memory cells.

5. The apparatus as set forth in claim 1, in which the in-circuit programming code and the user code in the single non-volatile memory device share high voltage pumping, sense amplifier, and input/output port structure.

6. The apparatus as set forth in claim 1, wherein the delegable memory controller is configured to perform the in-circuit programming update function to erase and then program at least a portion of the non-volatile memory cells of the single non-volatile memory device, wherein the update function occurs in real time either after deployment of the integrated circuit, or occurs in a factory where the integrated circuit is initially manufactured.

7. The apparatus as set forth in claim 1, wherein the non-volatile memory cells in the single non-volatile memory device comprise one of floating gate memory cells and trapped charge memory cells.

8. The apparatus as set forth in claim 1, wherein:
the code generator provides the at least one control routine according to a flag set to a first state by the delegable memory controller, thereby avoiding input/output ports conflict; and
the microprocessor does not access the single non-volatile memory device while executing the at least one control routine.

9. The apparatus as set forth in claim 8, wherein the delegable memory controller sets the flag to a second state upon completion of the in-circuit programming update function, thereby permitting the microprocessor to receive instructions from the single non-volatile memory device.

10. The apparatus as set forth in claim 1, in which the in-circuit programming code and the user code in the single non-volatile memory device share high voltage pumping circuitry, sense amplifiers, and input/output ports.

11. The apparatus as set forth in claim 1, wherein the in-circuit programming code and the user code are contained in the single non-volatile memory device, and are updated by the delegable memory controller without further memory device.

12. An apparatus for in-circuit programming of an integrated circuit, comprising:
a microprocessor configured to execute a sequence of instructions;
communication means for transmitting digital data to and receiving digital data from an external device;
a single non-volatile memory device comprising non-volatile memory cells on the integrated circuit that store instructions for execution by the microprocessor, the single non-volatile memory device containing in-circuit programming code for programming the single non-volatile memory device and user code for facilitating communication with the external device, wherein the in-circuit programming code can be reprogrammable and stored in a predetermined location of the single non-volatile memory device, and the user code can be stored in a location of the single non-volatile memory device that is different from the predetermined location;
a memory controller for performing an in-circuit programming update function in lieu of the microprocessor performing the in-circuit programming update function, upon the memory controller being enabled by the microprocessor to perform the in-circuit programming update function; and
a code generator for presenting instructions to the microprocessor without requiring the microprocessor to communicate with the single non-volatile memory device;
wherein the microprocessor, the communication means, the single non-volatile memory device, the memory controller, and the code generator are on a same single chip;
wherein the microprocessor is configured to execute at least one control routine, which does not require the microprocessor to use the non-volatile memory device, provided by the code generator while the memory controller performs the in-circuit programming update function.

13. The apparatus as set forth in claim 12, wherein the memory controller comprises control logic which is configured to notify the microprocessor when the in-circuit programming update function is completed.

14. The apparatus as set forth in claim 12, wherein the memory controller comprises a function of causing the microprocessor to execute instructions provided by the code generator before performing the in-circuit programming update function, and wherein the memory controller further comprises a function of providing an indication to the microprocessor upon completion of the in-circuit programming update function that the in-circuit programming update function has been completed.

15. The apparatus as set forth in claim 12, wherein:
the single non-volatile memory device comprises a flash memory device; and
the memory controller comprises a flash memory address controller, a control register, and a flash memory address decoder.

16. The apparatus as set forth in claim 12, wherein:
the single non-volatile memory device comprises a plurality of separately erasable blocks of the non-volatile memory cells, and the in-circuit programming code is stored in a predetermined block or group of blocks in the plurality of blocks; and
the in-circuit programming code and the user code in the single non-volatile memory device share high voltage pumping, sense amplifier, and input/output port structures.

17. The apparatus as set forth in claim 12, wherein the in-circuit programming code and the user code are contained in the single non-volatile memory device, and are updated by the memory controller without further memory device.

18. The apparatus as set forth in claim 12, wherein the code generator provides the at least one control routine according to a flag set to a first state by the delegable memory controller, thereby avoiding input/output ports conflict.

19. A method for in-circuit programming of an integrated circuit, comprising:
receiving an in-circuit program or user code modification instruction from an initiator disposed externally to the integrated circuit to a microprocessor on the integrated circuit;
forwarding the modification instruction through the microprocessor to a delegable memory controller;
executing at least one control routine by the microprocessor wherein the microprocessor does not access a single non-volatile memory device during the executing;

performing a function of code updating wherein code contained within the single non-volatile memory device is programmed with data from the initiator under control of the delegable memory controller, the code within the single non-volatile memory device comprises an in-circuit programming code and a user code, the in-circuit programming code can be reprogrammable and stored in a predetermined location of the single non-volatile memory device, and the user code can be stored in a location of the single non-volatile memory device that is different from the predetermined location; and accessing at least a portion of the updated code with the microprocessor;

wherein the single non-volatile memory device, the microprocessor, and the delegable memory controller are on a same single chip;

wherein the executing of at least one control routine is preceded by forwarding at least one control routine that does not require the microprocessor to use the non-volatile memory device to the microprocessor from a code generator.

20. The method as set forth in claim 19, wherein performance of the function of code updating is preceded by the microprocessor delegating the function of code updating to the delegable memory controller.

21. The method as set forth in claim 19, wherein:

the single non-volatile memory device comprises a flash memory;

the delegable memory controller comprises a flash memory address controller; and following the code updating under the control of the flash memory address controller sends a completion acknowledgement to the microprocessor thereby signaling the microprocessor to cease executing the at least one control routine.

22. The method as set forth in claim 19, wherein:

the in-circuit programming code and the user code are arranged in a plurality of blocks of non-volatile memory cells of the single non-volatile memory device;

the in-circuit programming code is stored in a particular block or group of blocks in the plurality of blocks of the single non-volatile memory device, and the code updating includes modifying a particular block or group of blocks of the single non-volatile memory device with at least one block of new in-circuit programming code or new user code.

23. The method as set forth in claim 22, wherein:

the integrated circuit includes at least one port to facilitate communication with the initiator;

the code updating includes exchanging data through the at least one port; and the in-circuit programming code and the user code within the single non-volatile memory device share high voltage pumping, sense amplifier, and input/output port structures.

24. The method as set forth in claim 19, wherein:

the in-circuit programming code and the user code within the single non-volatile memory device share high voltage pumping, sense amplifier, and input/output port structures.

25. The method as set forth in claim 24, wherein the code updating is preceded by the microprocessor delegating the function of code updating to the delegable memory controller.

26. The method as set forth in claim 25, wherein the step of forwarding the modification instruction through the microprocessor includes the enabling of a code generator capable of generating control routines and further includes enabling the microprocessor to enter a mode wherein the microprocessor executes the at least one control routine.

27. The method as set forth in claim 26, wherein:

the single non-volatile memory device comprises a single flash memory device;

the delegable memory controller comprises a flash memory address controller; and following the step of code updating the flash memory address controller provides an indication to the microprocessor signaling completion of the code updating.

28. The method as set forth in claim 19, wherein the in-circuit programming code and the user code are contained in the single non-volatile memory device, and are updated by the delegable memory controller without further memory device.

29. The method as set forth in claim 19, wherein the code generator provides the at least one control routine according to a flag set to a first state by the delegable memory controller, thereby avoiding input/output ports conflict.

* * * * *